United States Patent
Yan

(10) Patent No.: US 7,211,623 B2
(45) Date of Patent: May 1, 2007

(54) SYNTHETIC PLASTIC MATERIAL AND A METHOD OF MAKING THEREOF

(76) Inventor: Er Ming Yan, A1, 2FL, 6, East Bourne Road, Beacon Hill, Kowloon (HK)

( * ) Notice: Subject to any disclaimer, the term of this patent is extended or adjusted under 35 U.S.C. 154(b) by 260 days.

(21) Appl. No.: 10/212,061

(22) Filed: Aug. 6, 2002

(65) Prior Publication Data

US 2003/0055164 A1    Mar. 20, 2003

Related U.S. Application Data

(63) Continuation-in-part of application No. 09/833,636, filed on Apr. 13, 2001, now abandoned.

(51) Int. Cl.
*C08L 51/04* (2006.01)
*C08L 53/02* (2006.01)

(52) U.S. Cl. .............. 525/68; 525/71; 525/89

(58) Field of Classification Search ............ 525/68, 525/71, 89
See application file for complete search history.

(56) References Cited

U.S. PATENT DOCUMENTS

| | | | |
|---|---|---|---|
| 3,976,608 A | 8/1976 | Buckler et al. | |
| 4,188,432 A | 2/1980 | Gouw et al. | |
| 4,480,057 A * | 10/1984 | Sano | 523/206 |
| 4,507,436 A | 3/1985 | Axelrod et al. | |
| 4,578,429 A | 3/1986 | Gergen et al. | |
| 4,593,063 A | 6/1986 | Jones et al. | |
| 4,692,357 A | 9/1987 | Mayumi et al. | |
| 4,948,641 A | 8/1990 | Shantz et al. | |
| 4,994,508 A | 2/1991 | Shiraki et al. | |
| 5,091,473 A * | 2/1992 | Arashiro et al. | 525/92 B |
| 5,109,052 A * | 4/1992 | Kasai et al. | 524/505 |
| 5,387,636 A | 2/1995 | Landry et al. | |
| 6,153,307 A | 11/2000 | Baran | |
| 6,599,598 B1 * | 7/2003 | Tai et al. | 428/36.6 |

OTHER PUBLICATIONS

Rosato, "Rosato's Plastics Encyclopedia and Dictionary", Hanser Publishers, (1993) pp. 81 and 334.
Domininghaus, "Plastics for Engineers," *Materials, Properties, Applications*, Hanser Publishers, (1993) p. 216.
Modern Plastics Handbook, McGraw-Hill Publishers, (2000) pp. 1.69 and 1.70.
"Original BRABENDER instruments for laboratories and production," Brabender OHG Duisburg, Germany (2000), 4 pages.
"Hakke Materials Testing, Rheocord90," Hakke MessTechnik GmbH u. Co., Germany (May 1993), selected pages (6 pages total).

* cited by examiner

*Primary Examiner*—Jeffrey Mullis
(74) *Attorney, Agent, or Firm*—Buchanan Ingersoll & Rooney PC

(57) ABSTRACT

A method of producing a synthetic polymer blend comprising steps of (i) blending a styrene-butadiene-styrene thermoplastic elastomer (SBS) with a compatibilizer selected from the group consisting of polybutadiene grafted polystyrene resin (HIPS), styrene-hydrogenated-butadiene-styrene (SEBS) and poly-dimethyl-phenylene-oxide (PPO), and dispersing particles of said SBS to a mean particle size of substantially 3 microns or less in diameter, to form an intermediary ingredient, wherein $$\frac{\text{weight of the } SBS}{\text{weight of the compatibilizer}}$$

is substantially $$\frac{1}{4}$$

to 4; and (ii) blending the intermediary ingredient in the step b) with further ingredient(s) including at least general purpose polystyrene (GPPS), and further dispersing the SBS particles, to form the synthetic polymer blend, wherein $$\frac{\text{weight of the intermediary ingredient}}{\text{weight of the } GPPS}$$

is substantially $$\frac{1}{19} \text{ to } \frac{5}{6}.$$

35 Claims, 9 Drawing Sheets
(9 of 9 Drawing Sheet(s) Filed in Color)

PRIOR ART

PRIOR ART 5 microns 5 microns

PRIOR ART

GPPS 70%+HIPS 17%+PS-1 13%
+ Process-aid oil 0.1%+
Blue 2 B 0.05%+mixer 13/10/00

SYNTHETIC PLASTIC MATERIAL AND A METHOD OF MAKING THEREOF

CROSS REFERENCE TO RELATED APPLICATION

The present application is a continuation-in-part application of U.S. application Ser. No. 09/833,636, filed on Apr. 13, 2001, now abandoned the present application claims the benefit of priority under 35 U.S.C. § 120 to application Ser. No. 09/833,636.

BACKGROUND OF INVENTION

1. Field of Invention

The present invention relates to plastic polymer blend compounds, products made therefrom, intermediary ingredients for making such compounds and methods of producing such intermediary ingredients and such compounds.

2. Description of Prior Art

Plastics are used as materials for making a large variety of products nowadays. For examples, different types of plastic materials are widely used in making toys, various parts of electrical appliances and electronic products, household implements, decorative products, etc. When used in different contexts, the choice of plastic materials differs accordingly. Among other requirements, five requirements in particular are usually important in determining the choice of plastic materials, namely, (i) the mechanical properties (e.g. tensile strength, surface hardness, etc.), (ii) material properties (e.g. homogeneous material construction), (iii) compatibility between ingredients in compounded plastic materials, (iv) cosmetic characteristics such as coloring property and outward appearance (e.g. surface gloss, etc.) and (v) cost of production. For example, U.S. Pat. No. 4,593,063 discloses a type of plastic polymer blend and a method of making same. It is to be noted that the composition (or constituents) of a plastic material only partly contributes to its mechanical and material properties. There are other factors affecting the properties as well.

The present invention provides polymer blend compounds possessing novel characteristics addressing one or more of the above five requirements, and methods of making same. The polymer blend compounds and the methods can mitigate the drawbacks of the prior art, or at least to provide the public with a useful choice.

SUMMARY OF INVENTION

According to a first aspect of the present invention, there is provided an intermediary ingredient for use in making a synthetic polymer blend comprising a styrene-butadiene-styrene thermoplastic elastomer and a compatibilizer selected from the group consisting polybutadiene grafted polystyrene, styrene-hydrogenated-butadiene-styrene and poly-dimethyl-phenylene-oxide, wherein $$\frac{\text{weight of the } SBS}{\text{weight of the compatibilizer}}$$

is substantially $$\frac{1}{4}$$

to 4, and wherein mean particle size of the SBS in the intermediary ingredient is substantially 3 microns or less in diameter. It is to be noted that styrene-butadiene-styrene thermoplastic elastomer may also be referred to as triblock styrene-butadiene-styrene thermoplastic elastomer, polystyrene-block-polybutadiene-block-polystyrene, and is commonly abbreviated as SBS, the nomenclature of which is discussed at page 72 of Thermoplastic Elastomers (2$^{nd}$ Edition, published by Hanser) and an internet web page accessible via www.kraton.com. It is also to be noted that polybutadiene grafted polystyrene, styrene-hydrogenated-butadiene-styrene and poly-dimethyl-phenylene-oxide are commonly abbreviated as HIPS, SEBS and PPO respectively, and the nomenclature of which is explained in greater detail later in the description.

According to a second aspect of the present invention, there is provided a method of producing an intermediary ingredient for use in making a synthetic blend comprising a step of blending a styrene-butadiene-styrene thermoplastic elastomer (SBS) with a compatibilizer selected from the group consisting polybutadiene grafted polystyrene resin (HIPS), styrene-hydrogenated-butadiene-styrene (SEBS) and poly-dimethyl-phenylene-oxide (PPO), and dispersing particles of the SBS to a mean particle size of substantially 3 microns or less in diameter, to form an intermediary material, wherein $$\frac{\text{weight of the } SBS}{\text{weight of the compatibilizer}}$$

is substantially $$\frac{1}{4}$$

to 4. However, it is preferable that the mean particle size of the particles of the SBS after dispersion may be in the range of substantially 0.6 to 1 micron or less in size.

Preferably, the compatibilizer may be HIPS. One of the main reasons to use HIPS over SEBS or PPO is that around the time of filing this application, HIPS has been consistently less expensive than SEBS and PPO, and thus using HIPS as the compatibilizer is more cost efficient. However, a combination of HIPS, SEBS and PPO may be used as the compatibilizer.

Preferably, the SBS may comprise substantially 20 wt % to 70 wt % of butadiene. The SBS may also comprise substantially 40 wt % to 70 wt % of butadiene. In particular, the SBS may comprise substantially 60 wt % of butadiene. Studies have shown that the SBS may comprise up to about 20 wt % to 70 wt % of butadiene and the intermediary ingredient produced as a result will still have desired physical characteristics including mechanical and material characteristics. It is to be noted that the weight content (wt %) refers to the butadiene in the SBS.

Suitably, $$\frac{\text{weight of the SBS}}{\text{weight of the compatibilizer}}$$

in the intermediary ingredient may be substantially $$\frac{33}{17}.$$

The intermediary ingredient may preferably comprise substantially 20 wt % to 80 wt % of the SBS. More preferably, the intermediary ingredient may comprise substantially 60 wt % to 80 wt % of the SBS.

According to a third aspect of the present invention, there is provided a method of producing a synthetic polymer blend comprising steps of firstly blending a styrene-butadiene-styrene thermoplastic elastomer (SBS) with a compatibilizer selected from the group consisting polybutadiene grafted polystyrene resin (HIPS), styrene-hydrogenated-butadiene-styrene (SEBS) and poly-dimethyl-phenylene-oxide (PPO), and dispersing particles of the SBS to a size of substantially 3 microns of less in diameter, to form an intermediary ingredient, wherein $$\frac{\text{weight of the SBS}}{\text{weight of the compatibilizer}}$$

is substantially $$\frac{1}{4}$$

to 4; and secondly blending the intermediary ingredient from above with further ingredient(s) including at least general purpose polystyrene (GPPS), and further dispersing the SBS particles, to form the synthetic polymer blend, wherein $$\frac{\text{weight of the intermediary ingredient}}{\text{weight of the GPPS}}$$

is substantially $$\frac{1}{19} \text{ to } \frac{5}{6}.$$

One of the functions of the second step of blending is to further disperse the SBS particles. After the second step of blending, there may be provided a step of subjecting the synthetic polymer blend to at least one plastic processing method selected from a group including injection molding and extrusion.

According to a fourth aspect of the present invention, there is provided a method of producing a synthetic polymer blend comprising steps of firstly dispersing a styrene-butadiene-styrene thermoplastic elastomer (SBS) with a compatibilizer selected from the group consisting polybutadiene grafted polystyrene resin (HIPS), styrene-hydrogenated-butadiene-styrene (SEBS) and poly-dimethyl-phenylene-oxide (PPO) to form an intermediary ingredient by blending using an extruder having screw shearing or kneading elements, and subjecting the SBS and the compatibilizer with a shear rate of substantially 131,440 or more, wherein $$\frac{\text{weight of the SBS}}{\text{weight of the compatibilizer}}$$

is substantially $$\frac{1}{4}$$

to 4, and wherein $$\frac{\text{net power consumption for polymer dispersion of a main motor of the extruder}}{\text{output of the intermediate ingredient by the extruder}}$$

is substantially 0.14 kW/kg or more; and secondly blending the intermediary ingredient from above with further ingredient(s) including at least general purpose polystyrene (GPPS), to form the synthetic polymer blend, wherein $$\frac{\text{weight of the intermediary ingredient}}{\text{weight of the GPPS}}$$

is substantially $$\frac{1}{19} \text{ to } \frac{5}{6}.$$

One of functions of the second step blending is to further disperse the SBS particles. After the second step of blending, there may be provided a step of subjecting the synthetic polymer blend to at least one plastic processing method selected from a group including injection molding and extrusion.

Preferably, the compatibilizer may be HIPS.

Preferably, the further ingredients may comprise further HIPS, and wherein the synthetic polymer blend may comprise substantially 5 wt % to 50 wt % of the further HIPS from the further ingredients.

Advantageously, each of the methods of the third and fourth aspects of the present invention may comprise a step of adding a first additive for improving cosmetic characteristics (e.g. surface gloss) of the synthetic polymer blend or products made thereof. The first additive may be of substantially 0.5 wt % of the polymer blend. The first additive may be selected from a group including zinc stearate, waxes and silicones. The waxes may be selected from a group including amide waxes, motanic waxes. The silicones may be selected from a group including dimethylsilicone of different molecular weight and ultra-high molecular weight silicone.

Each of the methods of the third and fourth aspects of the present invention may preferably comprise a step of adding at least a second additive selected from a group including coupling agents, cross-linking agents, peroxides and other compatibilizers. The synthetic polymer blend may suitably be adjusted to comprise substantially 10 wt % to 13 wt % of the intermediary ingredient.

The synthetic polymer blend may suitably be adjusted to comprise substantially 30 wt % to 90 wt % of the GPPS. The synthetic polymer blend may alternatively be adjusted to comprise substantially 75 wt % to 95 wt % of the GPPS.

According to a fifth aspect of the present invention, there is provided a synthetic polymer blend made by a method in accordance with the third aspect of the present invention.

According to a sixth aspect of the present invention, there is provided a synthetic polymer blend made by a method in accordance with the fourth aspect of the present invention.

BRIEF DESCRIPTION OF DRAWINGS

The patent or application file contains at least one drawing executed in color. Copies of this patent or patent application publication with color drawing(s) will be provided by the Office upon request and payment of the necesary fee.

The invention will now be described, by way of examples only, with reference to the following drawings in which.

DETAILED DESCRIPTION OF THE PREFERRED EMBODIMENTS AND THE INVENTION

Figure 1:
FIG. 1 is a photographic representation of two products made from a conventional styrene-butadiene-styrene thermoplastic elastomer (SBS) reinforced general-purpose polystyrene (GPPS) blended compound.

Acrylonitrile-butadiene-stryene (ABS) is a tough rigid plastic material which has been used widely, e.g. for automobile parts, building materials and household electrical appliances. ABS however is significantly more expensive than general-purpose polystyrene (GPPS). Up to the time of filing this application, ABS has been consistently more costly than GPPS for the past ten years. The price gap between ABS and GPPS has been around USD150 to 200 per metric ton, as shown in Table 1 below. Products made of ABS are thus more expensive. The nomenclature of general-purpose polystyrene (GPPS) is discussed at page B-33 of Modem Plastics 2001 World Encyclopedia.

TABLE 1

Cost of plastics materials

| Material | Cost per metric ton, in USD, based on FIGS. during the past 10 years |
|---|---|
| ABS | 850 to 1200 |
| GPPS | 700 to 1000 |
| SBS | 1500 to 1700 |
| Cost difference between ABS and GPPS | 150 to 200 |

(Note 1: The price of ABS and GPPS fluctuates due to various economic reasons. The cost FIGS. represent the general range of costs during the past ten years. It is to be noted that although the costs of ABS and GPPS vary, the cost difference between ABS and GPPS has remained fairly constant.)

GPPS has a lower mechanical property than ABS. However, it has been known that when styrene-butadiene-styrene (also known as "SBS" as noted above) is added to GPPS, the mechanical properties and in particular the impact resistance of the resulting SBS reinforced GPPS blended compound can be improved accordingly. Styrene-butadiene-styrene thermoplastic elastomer generally contains styrene as end blocks and butadiene, and is hereinafter referred to as SBS for simplicity. Table 2 below illustrates various mechanical properties of ABS and two conventional SBS reinforced GPPS blended compounds.

TABLE 2

Mechanical properties of ABS and conventional SBS reinforced GPPS blended compounds

| Mechanical Property Type | ABS | SBS reinforced GPPS compound (15 wt% SBS and 85 wt% GPPS) | SBS reinforced GPPS compound (30 wt% SBS and 70 wt% GPPS) |
|---|---|---|---|
| Notched Izod impact (ft-lb/in) | 2.94 | 0.42 | 1.84 |
| Tensile strength (psi) | 7080 | 5450 | 3300 |
| Elongation at break (%) | 20 | 34 | 52 |

(Note 2: ABS referred to is Chi Mei PA 757, SBS referred to is Stereon 840 of Firestone Synthetic Rubber and Latex Co. Data obtained from US Patent No. 4,593,063.)

As illustrated in Table 2 above, when GPPS is reinforced by substantially 15 wt % of SBS in the SBS reinforced GPPS, the impact resistance has become 0.42 ft-lb/in. When the SBS content is increased to 30 wt %, the impact resistance increases to 1.84 ft-lb/in.

One drawback, however, is that SBS is significantly more expensive than ABS, and thus the cost of producing SBS reinforced GPPS blended compound can be higher than that of ABS, which makes it economically undesirable by plastics manufacturers. As shown in Table 3 below, the total cost of producing conventional SBS reinforced GPPS blended compound (with 12 wt % SBS and 88 wt % GPPS) is about USD 946 to 1284 per metric ton during the past ten years before filing the present application.

TABLE 3

Costs in respect of producing a conventional polymer blend compound comprising substantially 12 wt % SBS and 88 wt % GPPS

| Cost Item | Cost, in USD, based on FIGS. during the past 10 years |
|---|---|
| 12 wt % SBS (in conventional SBS reinforced GPPS compound) | 180 to 204 |
| Compounding cost | 150 to 200 |
| 12 wt % SBS and compounding cost | 330 to 404 |
| 88 wt % GPPS (in conventional SBS reinforced GPPS compound) | 616 to 880 |
| 12 wt % SBS, 88 wt % GPPS and compounding cost for producing conventional SBS reinforced GPPS compound | 946 to 1284 |

(Note 3: Compounding cost is the cost of making the blended compound from raw materials. This total cost is dictated by batch size, equipment cost, energy cost, labor cost, different compounders used, etc. At around the time of filing this application, the compounding cost of USD 150 to 200 is considered as low in the plastics industry.)

Referring back to Table 1, the cost of ABS is about USD 850 to 1200 per metric ton. Thus, in practice conventional SBS reinforced GPPS is usually less competitive than ABS in terms of cost.

Other relevant drawbacks are that conventional SBS reinforced GPPS blended compounds when compared to ABS tend to have poor mechanical and material properties and suffer from the problems of delamination, weak weld-line, poor coloration and low surface hardness. These problems are caused by the general physical incompatibility between SBS and GPPS. We will discuss these problems as follows.

As discussed above, the impact resistance of conventional SBS reinforced GPPS blended compound can be increased as the SBS content in the blended compound is increased. However, increasing the content of SBS inevitably increases the overall cost of the blended compound as SBS is relatively more costly. It is also to be noted that as the SBS content in SBS reinforced GPPS blended compound is increased, the overall tensile strength is lowered. For instance, as can be seen in Table 2 above, when the SBS content is increased from 15 wt % to 30 wt % in a SBS reinforced GPPS blended compound, the tensile strength is reduced from 5450 psi to 3300 psi.

Referring to Table 4 below, it is illustrated that the overall surface hardness of conventional SBS reinforced GPPS blended compound decreases as the content of SBS therein increases.

TABLE 4

Surface hardness of ABS and SBS reinforced GPPS blended compounds

| Material Type | Hardness in Rockwell R |
|---|---|
| ABS | 109 |
| 10 wt % SBS/90 wt % GPPS compound | 106 |
| 20 wt % SBS/80 wt % GPPS compound | 84 |

(Note 4: *Data is obtained from Plastic Additives and Modifiers Handbook, 1991, Block Polymers, by James E. Salary and David J. Dougherty, Van Nostrand Reinhold)

Low surface hardness of SBS reinforced GPPS compound causes finished products made therefrom to develop scratches, e.g. by fingernail, easily. When the SBS content is maintained at substantially 20 wt %, the surface hardness is Rockwell 84R. When the SBS content is maintained at substantially 10 wt %, the surface hardness is Rockwell 106R, which is comparable to ABS which has a surface hardness of 109R. A product with a surface hardness of Rockwell 109R is not prone to develop scratches.

As discussed above, SBS is generally not well compatible with GPPS. This causes delamination problem in the finished products made therefrom. The delaminating nature of SBS reinforced GPPS blended compound also often causes problem during production and in particular large-scale production. For example, screw assembling columns and reinforcing ribs of the finished products are formed in troughs of the mold cavity during injection molding process. As the finished products together with its screw assembling columns or reinforcing ribs are being released from the mold after injection molding, the base (or root) areas where the screw assembling columns or reinforcing ribs extend from the finished products are prone to breakage, so that such columns or ribs are left stuck in the troughs of the mold cavity. This is because the base areas are in particular weaker in strength. The weaker nature of the base areas is due to the delaminating nature of SBS reinforced GPPS blended material used. It is well known in the field that it is very difficult to retrieve such screw assembling columns or reinforcing ribs from the troughs of the mold cavity, such retrieval will cause damage to the mold, and seriously interrupt the normal molding process.

Referring to FIG. 1, two articles made of conventional SBS reinforced GPPS blended compound (87 wt % GPPS and 13 wt % SBS) are shown side by side. The article on the right is broken, and shows a crack on the upper end of the article. The delamination problem contributes to the "layered" structure revealed in the crack as shown more detail in FIG. 2. It is known in the plastics industry that polymers that have serious delamination problem cannot be used to make qualified products. (The articles shown in FIGS. 1 and 2 were molded at The Hong Kong Precision Injection Laboratory. The molding used Negri Bossi NB 2150 metric ton clamping force injection molding machine. Materials were blended once by using a twin-screw blender with a screw diameter of 46 mm at 400 rpm. An extruder similar to Werner & Phleider was used.)

Figure 2:
FIG. 2 is a photographic representation showing a crack of one of the products shown in FIG. 1.

The general incompatibility of SBS and GPPS also causes the weak weld-line problem mentioned above. FIG. 2 shows sharp edges of the crack caused by the weak-weld line problem resulting from the incompatibility of SBS and GPPS. During plastics production, molten polymer blend is molded (e.g. injection molded) into a desired shape and configuration. A weld-line is an area where fluidized blended polymer from different directions flows and merges to combine and form the finished product. The weak weld-line problem refers to a situation whereby plastics product breaks easily at the weld-line area.

Figure 3:
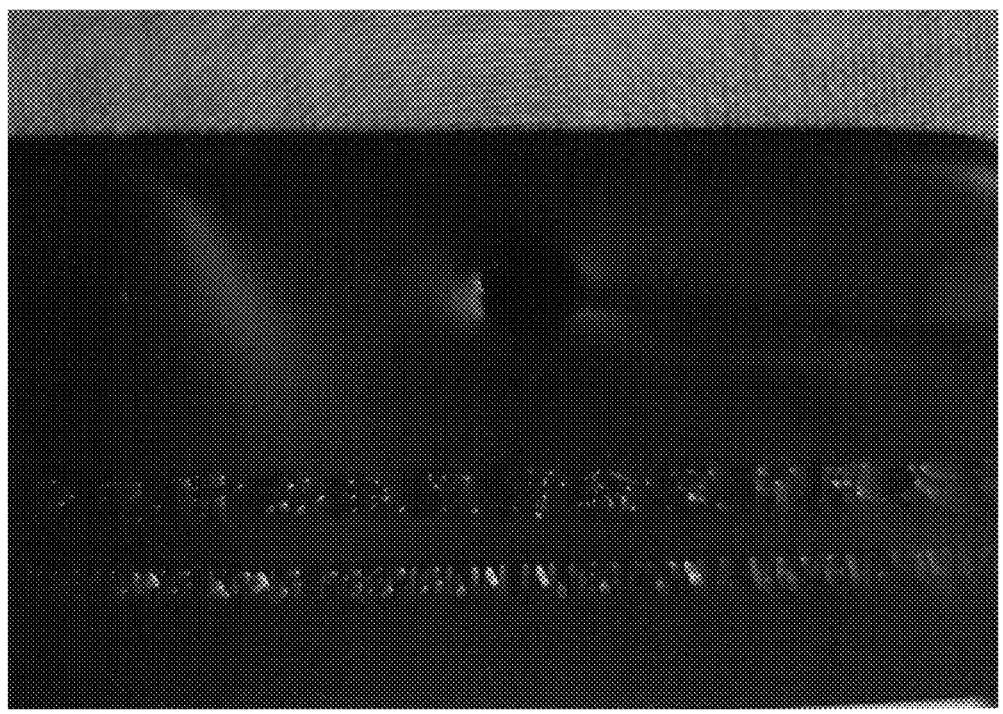
FIG. 3 is a photographic representation showing a product made from a conventional styrene-butadiene-styrene thermoplastic elastomer (SBS) reinforced general-purpose polystyrene (GPPS) blended compound.

A further problem caused by the incompatibility of SBS and GPPS is the poor coloration of products made from SBS reinforced GPPS blended compound. This is because micro-reflection caused by material delamination phases are resulted in SBS reinforced GPPS pre-blended compound, which causes a pearlescent base colour of the products made therefrom. FIG. 3 shows an article made of conventional SBS reinforced GPPS blended compound. 0.05 wt % of a commonly used plastic blue dye C.I., Solvent blue 36, was added into the blended compound from which the article is made. As can be seen, the blue color is of a pearlescent base colour. This characteristic is generally neither attractive to nor desirable by a user. In other words, polymer blends made of essentially SBS and GPPS generally have not been desirable to be used for making products.

Products made of a polymer blend in accordance with the present invention has significant advantages over ABS in some aspects and conventional SBS reinforced GPPS blended compound in certain respects. It is to be noted that different polymer blends may have the same chemical composition and yet the mechanical and/or material properties can be different. As such, a polymer blend should preferably be defined according not only to its chemical composition but also its physical properties including mechanical and material properties. In other words, the mechanical and material properties of a polymer blend may be resulted from its chemical composition as well as the process of production thereof. The production process critically affects the its polymer morphology of the polymer blend.

One aspect of the present invention is to provide a novel polymer blend comprising SBS, a compatibilizer such as polybutadiene grafted polystyrene (or polystyrene grafted polybutadiene), and GPPS as the main ingredients, and the method of making thereof. It is to be noted that the term "graft copolymer" in the context of polymer science refers to a chain of one type of polymer (plastic) to which side chains of a different type are attached or grafted, such as polymerizing butadiene and styrene monomer at the same time. Butadiene-styrene thermoplastic is also referred to as styrene-butadiene thermoplastic. According to Rosato's Plastics Encyclopedia and Dictionary (Dominick V. Rosato, Harsen Publishers, Munich Vienna New York Barcelona: pages 344 and 81). The resultant graft copolymer may thus be called polybutadiene grafted polystyrene (or polystyrene grafted polybutadiene) which, as indicated above, are used interchangeably.

It is also to be noted that polybutadiene grafted polystyrene (or polystyrene grafted polybutadiene) is commonly abbreviated as HIPS. The nomenclature of polybutadiene grafted polystyrene, (or polystyrene grafted polybutadiene) and HIPS is also discussed in Rosato. A publication on HIPS by the Department of Polymer Science at the University of Southern Mississippi is accessible via the Internet address of www.psu.usm.edu/macrog/copoly.htm. According to the University of Southern Mississippi publication, one kind of graft copolymer is high-impact polystyrene, or HIPS for short. The structure of HIPS comprises a polystyrene backbone with chains of polybutadiene grafted onto the polystyrene backbone.

Six examples of the novel polymer blend are illustrated below.

EXAMPLE 1

The composition of a first example of a polymer blend according to the present invention is shown in Table 5 below.

TABLE 5

Chemical compositions of novel polymer blends

| Example | Masterbatch Material, in wt % of total polymer blend | Polybutadiene Grafted Polystyrene (HIPS), in wt % of total polymer blend | General Purpose Polystyrene (GPPS), in wt % of total polymer blend |
|---|---|---|---|
| 1 | 10 to 13 | 15 to 17 | 70 to 75 |
| 2 | 5 to 25 | — | 75 to 95 |
| 3 | 13 | 17 | 70 |
| 4 | 13 | 12 | 75 |
| 5 | 10 | 17 | 73 |
| 6 | 13 | 17 | 70 |

The method for making the polymer blend in Example 1 involves a process having at least two blending steps. The objective of the first blending step is to prepare a masterbatch material (which serves as an intermediary ingredient) comprising mainly SBS and a compatibilizer. The compatibilizer used in this example is HIPS (which, as noted above, stands for polybutadiene grafted polystyrene (or polystyrene grafted polybutadiene) although studies have shown that other suitable compatibilizers including styrene-hydrogenatedbutadiene-styrene (SEBS) and poly-dimethyl-phenyleneoxide (PPO) may also be used. Alternatively, a mixture of HIPS, SEBS or PPO may be used as the compatibilizer. The ratio of the weight of SBS to the weight of the compatibilizer (i.e. HIPS) in the first step for making the masterbatch material is around 33:17 (i.e. about 66 wt % of SBS and 34 wt % of HIPS in the masterbatch material) although studies have shown that the ratio can also be in the workable range of 3:2 to 4:1 (i.e. about 60 wt % to 80 wt % of SBS and 20 wt % to 40 wt % of HIPS in the masterbatch material) or even in the wider workable range of 1:4 to 4:1 (i.e. about 20 wt % to 80 wt % of SBS and 20 wt % to 80 wt % of HIPS in the masterbatch material). The butadiene content in SBS used in this example is substantially 60 wt % although studies have shown that the butadiene content in SBS may preferably be in the workable range of about 40 wt % to 70 wt % or even in the wider workable range of 20 wt % to 70 wt %.

It is to be noted that the main composition of the intermediary ingredient (i.e. SBS and HIPS) is required to undergo certain specific process such that the resultant masterbatch material and the final polymer blend will possess the desired physical properties including mechanical and material properties. In particular, SBS and HIPS are firstly blended together in order to highly disperse SBS in their mixture. The dispersion can be achieved by adopting a twin-screw extrusion process commonly known in the plastics industry although other suitable blending methods may also be used. As noted, there are specific requirements or specific conditions required on the extrusion process such that the masterbatch material (and also the final polymer blend) will acquire not only the chemical characteristics but also more importantly the desired physical. These requirements are revealed during the course of research of the present invention. It has been identified that particles in a polymer blend should be sufficiently dispersed otherwise products made therefrom will have poor mechanical and material properties. To achieve a sufficiently high dispersion of the particles in the polymer blend, in addition to adopting a blending process having at least two steps of blending, a twin screw extruder with screw shearing or kneading elements for producing the masterbatch material is required. The composition of the masterbatch material is required to be adequately dispersed by a sufficient shear rate ($\eta$) generated by the extruder. The formula for calculating $\eta$ is shown as follows.

$$\eta = \frac{\pi \times D \times n}{h}$$

where

D is the diameter of shearing or kneading element of extruder;

n is the number of revolution per minute (rpm) of the screw of the extruder; and h is the closest distance between adjacent opposite shearing or kneading elements of the extruder.

In the instant example, the linear rotation speed of the outer diameter of the shearing element is $$1564 \text{ mm/sec} \left( = \frac{\pi \times D \times n}{60} = \frac{3.14 \times 46 \text{ mm} \times 650 \text{ rpm}}{60 \text{ sec}} \right).$$

The closest distance between the adjacent opposite shearing or kneading elements is 0.5 mm. The shear rate is therefore about $$187,772 \left( \eta = \frac{\pi \times D \times n}{h} = \frac{3.14 \times 46 \times 650}{0.5} \right).$$

However, studies have shown that in practice the masterbatch ingredients can be subject to a shear rate of about 131,440 or higher and the desired physical properties including mechanical and material properties can still be acquired.

In addition to the requirement on the shear rate, there is also a minimum requirement on the energy input in the compounding (or blending) process (or energy consumption by a main motor of the extruder). The energy requirement per unit of output of the extruder, Sme (specific mechanical energy), is calculated by the formula as follows.

$$Sme = \frac{P}{O}$$

where
- P is the net power supply needed or the net power consumption for polymer dispersion by the main motor of extruder during the shearing or kneading process for the output of a unit of masterbatch material; and
- O is the output of extruder, i.e. the weight of the masterbatch material produced by the extruder.

In the instant example, the output, O, of the extruder is about 400 kg/hr and the net power supply for polymer dispersion, P, required is about 80 kW. The energy consumption is therefore about $$0.2 \text{ kW} \left( Sme = \frac{P}{O} = \frac{80}{400} \right)$$

for the production of each kilogram of the masterbatch material although studies have shown that in practice a specific mechanical energy of about 0.14 kW or higher will still work to produce the properties.

The above two requirements on the shear rate and power consumption together ensure that the masterbatch material produced has undergone relatively and sufficiently high shear rate such that a relatively high dispersion of the SBS particles is achieved. In the instant example, the SBS particles are dispersed to about 0.6 to 1 micron which meets the requirements on the mechanical properties and material properties of the present invention. The effect of the particle size will be discussed in further detail later in the description. However, it is to be noted that studies have shown that masterbatch material with SBS particles dispersed to about 3 microns or less, or even about 6 microns or less, will still satisfy the requirements on the mechanical and material properties of the present invention. The properties would however be lower if the SBS particles are only dispersed to about 3 to 6 microns in diameter. It is to be noted that the particle size referred herein means the mean particle size.

Other parameters in producing the masterbatch material according to the present invention are discussed below although they are not essential. For example, each of the shearing or kneading elements used in the instant example has a diameter of 46 mm. The ratio of the length and the diameter (L/D ratio) of the screw of the extruder in the instant example is about 40 to 1. The distance (or gap) between the adjacent opposite screw shearing or kneading elements in the extruder in the instant example is about 0.5 mm.

The objective of blending SBS with the compatibilizer (i.e. HIPS in this example) is to highly and evenly disperse SBS in the matrix of the masterbatch material. There has been no or insufficient information in the prior art to teach the making of a masterbatch material having such composition and made according to the above process under the requirements. As noted the specific requirements are essential in addition to the requirements on chemical composition to produce the masterbatch material, or intermediary ingredient, possessing the desired mechanical and material properties which are further discussed later below.

As compared with SBS and GPPS in a conventional polymer blend, SBS and HIPS in a masterbatch material made in accordance with the above process have better compatibility with each other. HIPS serves as a good compatibilizer in the masterbatch material (and the subsequent final polymer blend) for enhancing the reinforcing properties of SBS. As indicated above, other compatibilizers such as SEBS and PPO may also be used. However, SEBS and PPO are relatively more expensive than HIPS so using SEBS and/or PPO as the compatibilizer in making the intermediary ingredient is less cost effective. It is envisaged that a combination of HIPS, SEBS and PPO may be used as the compatibilizer. Besides cost consideration, the compatibilizer used must also be safe with food contact so that at least FDA approval (or approval from other relevant authorities) can be obtained. Other additives (e.g. coupling agents, cross-linking agents, peroxides or other compatibilizers) in trace amount as known to those skilled in the art may also be added during this initial blending step.

The method also comprises a second step of blending the masterbatch material with further ingredients including at least GPPS to form a final polymer blend compound. It is to be noted that an injection molding machine or extruder having a good mixing property is preferably used. It is also noted that in the case of injection process, a high-dispersion process art control (such as having a back pressure of screw recovery mechanism is provided for enhancing the dispersion of the masterbatch material in the final polymer blend compounds) is preferably adopted.

Additional HIPS may also be added in the second blending step. Instead of using additional HIPS, additional SEBS and/or PPO may also be used. The amount of masterbatch material prepared from the first step may preferably account for substantially 10 wt % to 13 wt % of the final polymer blend compound, and GPPS may preferably account for substantially 70 wt % to 75 wt % of the final polymer blend compound, and additional HIPS may account for substantially 15 wt % to 17 wt % of the final polymer blend compound. However, studies have shown that wider workable ranges of substantially 5 wt % to 25 wt % of masterbatch material, 30 wt % to 90 wt % of GPPS and 5 wt % to 50 wt % of additional HIPS in the final polymer blend may also be used. In other words, $$\frac{\text{weight of said masterbatch material}}{\text{weight of said GPPS}}$$

effectively ranges from $$\frac{1}{18} \text{ to } \frac{5}{6} \left( = \frac{5 \text{ wt \%}}{90 \text{ wt \%}} \text{ to } \frac{25 \text{ wt \%}}{30 \text{ wt \%}} \right).$$

In the second step, the blending may be performed by conventional injection molding or extrusion although other suitable processes may also be adopted. A high dispersion static-mixing nozzle may also be used to further improve the dispersion property of the masterbatch material, GPPS and additional HIPS. A trace amount of additives (e.g. color additives) may also be added in this blending step in order to improve the coloration of products made from the final polymer blend compound. For instance, about 0.5 wt % of zinc stearate may be added to serve as an external lubricant. Other additives such as waxes selected from amide waxes, montanic waxes, dimethylsilicone having different molecular weight and ultra-high molecular weight silicone may also be added with the masterbatch material, GPPS and HIPS to form the final polymer blend. It is to be noted that the example described above utilizes a two-step blending process. The first step blending of SBS in and with HIPS allows a relatively high dispersion of SBS in the masterbatch material due to (i) the higher compatibility between SBS and HIPS as compared with that between SBS and GPPS alone and (ii) the blending process under the specific conditions providing a relatively higher shearing force during blending. The second blending step allows mixing of the already dispersed SBS in the masterbatch material obtained from the first step with GPPS and optionally additional HIPS. The second blending step also allows further dispersion of the SBS particles in the final polymer blend.

In a one-step blending of SBS and GPPS, SBS cannot be highly dispersed due to the inherent incompatibility of SBS and GPPS. Blending SBS with HIPS, SEBS or PPO under conventional blending conditions (with lower shearing rate) similarly cannot sufficiently disperse SBS therein neither. In this instant example, the advantage of using the above two-step blending method is that SBS can be highly dispersed initially under the above specific conditions. It is also to be noted that by using the two-step blending method the overall compounding cost is reduced significantly. For the sake of explanation, it is assumed that the compounding cost for producing one metric ton of a polymer blend (e.g. conventional SBS reinforced GPPS polymer blend) is $X. Further cost of $Y is incurred when the conventional polymer blend is used for making (e.g. molding) final products via, for example, injection molding. The total cost in blending and subsequent injection molding is therefore $(X+Y). On the other hand, the novel polymer blend of this example comprises from about 10 wt % to 13 wt % of masterbatch material and the compounding cost of preparing the masterbatch material (0.10X to 0.13X metric ton) for use in making one metric ton of polymer blend for subsequent injection molding is thus $(0.10X) to $(0.13X). Since the cost in connection with the subsequent injection molding (i.e. $Y) cannot be avoided whichever molding method is used and is weight dependent, the two-step blending method according to the present invention allows substantial savings in overall compounding cost, as the overall compounding cost when using the method according to present invention is $(0.10X+Y) to $(0.13X+Y), which is clearly less than $(X+Y).

EXAMPLE 2

The amount of masterbatch material, GPPS and HIPS used in the second step blending in the above Example 1 is preferably about 10 wt % to 13 wt %, 70 wt % to 75 wt % and 15 wt % to 17 wt % of the final polymer blend compound respectively. In Example 2, the specific conditions used in the process of making the masterbatch material are the same in Example 1. However, HIPS is not added in the second step blending. When HIPS is not used, substantially 5 wt % to 25 wt % of the masterbatch material and substantially 75 wt % to 95 wt % GPPS are used in the second step blending instead. In other words, $$\frac{\text{weight of said masterbatch material}}{\text{weight of said GPPS}}$$

ranges effectively from $$\frac{1}{19} \text{ to } \frac{1}{3} \left( = \frac{5 \text{ wt \%}}{95 \text{ wt \%}} \text{ to } \frac{25 \text{ wt \%}}{75 \text{ wt \%}} \right).$$

The composition of the polymer blend as illustrated in this example is also shown in Table 5 above.

EXAMPLES 3 & 4

There is also shown in Table 5 above the compositions of the polymer blends in Example 3 and Example 4 of the present invention. In Example 3, the same two-step blending method as discussed above was used. However, the constituents used in making the novel polymer blend in Example 3 include substantially 13 wt % masterbatch material, 17 wt % HIPS and 70 wt % GPPS. In Example 4, the constituents used include substantially 13 wt % masterbatch material, 12 wt % HIPS and 75 wt % GPPS. The constituents of the polymer blend in Example 3 are also shown in Table 8 below. The specific conditions required in making the masterbatch materials in these two examples are essentially the same as in Example 1.

EXAMPLE 5

Preparation of a novel polymer blend in Example 5 used the same two-step blending as discussed above. Table 5 above and Table 8 below illustrate the ingredients used in making the novel polymer blend in Example 5. The polymer blend comprises substantially 10 wt % masterbatch material, 17 wt % HIPS and 73 wt % GPPS. The specific conditions in making the masterbatch material in this example are essentially the same as in Example 1.

EXAMPLE 6

Figure 4A:
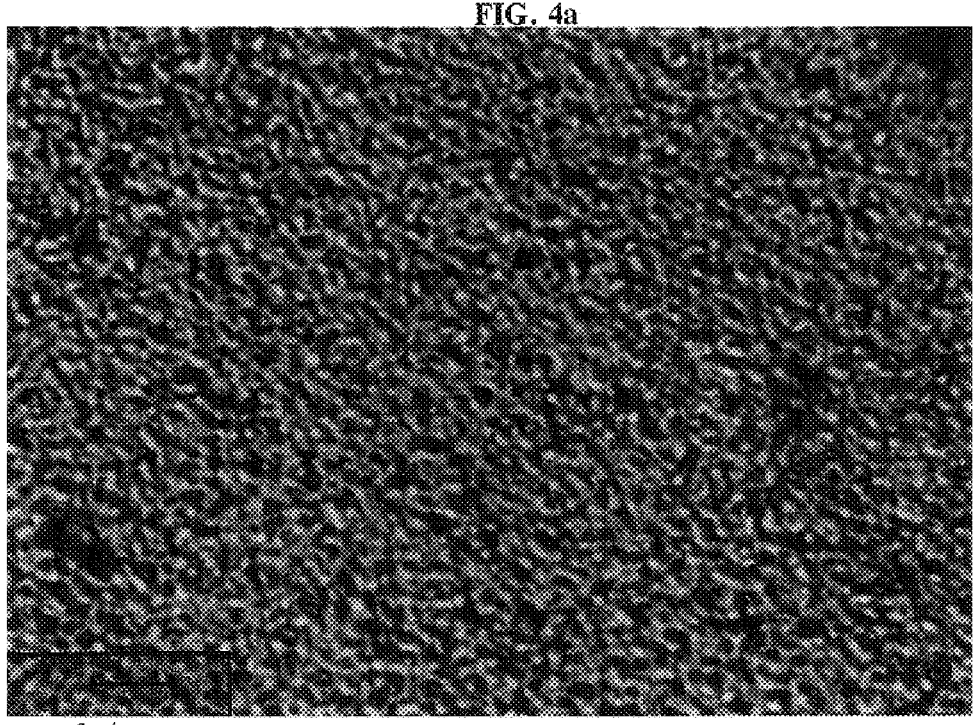
FIG. 4a is a magnified photographic representation showing a polymer morphology of an intermediary ingredient for use in making a polymer blend according to the present invention.

Preparation of a novel polymer blend in this example used substantially 13 wt % masterbatch material, 17 wt % HIPS and 70 wt % GPPS. FIGS. 4a and b show a product made from the novel polymer blend of this example. The composition of the polymer as illustrated in this example is also shown in Table 5 above. The specific conditions in making the masterbatch material are essentially the same as in Example 1.

The advantages of the novel masterbatch material and polymer blends made according to the present invention (as illustrated by way of examples, i.e. Examples 1 to 6) are further discussed below and summarized in Tables 6 to 8 and FIGS. 6 to 8. A first advantage of the novel polymer blends over conventional SBS reinforced GPPS blended compounds is its generally improved impact resistance and elongation of break (or breakage) as shown in the following Table 6. Table 6 summarizes the experimental results from testing various mechanical properties of a conventional SBS reinforced GPPS blended compound and the novel polymer blends made according to the present invention.

TABLE 6

Mechanical properties of different polymer blends

| Mechanical Property | Conventional SBS reinforced GPPS (15 wt % SBS and 85 wt % GPPS) | Novel two-step blended plastic materials (10 wt % masterbatch material, 17 wt % HIPS and 73 wt % GPPS) | Novel two-step blended plastic materials (13 wt % masterbatch material, 17 wt % HIPS and 70 wt % GPPS) |
|---|---|---|---|
| Notched Izod impact (ft-lb/in) | 0.42 | 0.81 | 0.86 |
| Tensile strength (psi) | 5450 | 4226 | 4112 |
| Elongation at break (%) | 34 | 46.2 | 44.2 |

The two novel polymer blends in Table 6 made according to the present invention have higher impact resistance (0.81 ft-lb/in and 0.86 ft-lb/in) than the conventional SBS reinforced GPPS blended compound (0.42 ft-lb/in). It can also be seen that the novel polymer blends have higher level of elongation of break (about 46.2% and 44.2%) than the conventional blend compound (about 34%). Experiments have also shown that polymer blends having the constituents of any of SBS, HIPS and GPPS but made under the conventional one-step blending method similarly have weaker impact resistance, lower tensile strength and elongation at break.

Referring to Table 7 below, it is shown that the novel polymer blend compound made according to the present invention has higher surface hardness than conventional SBS reinforced GPPS compound.

TABLE 7

Physical properties of polymer blends

| Surface property | ABS | Conventional SBS** reinforced GPPS compound (13 wt % and 87 wt %) | Novel two-step blended plastic materials (8.6 wt % SBS**, 21.4 wt % HIPS and 70 wt % GPPS) |
|---|---|---|---|
| Surface Hardness, in Shore, D | 79 | 74.5 | 77 |

(Note 5: Shore D meter: Teclock GS-702N;
**Note 6: The butadiene to styrene ratio of SBS is substantially 3:2.)

TABLE 8

Cost comparison of ABS, conventional SBS reinforced GPPS compound, high dispersion masterbatch material of SBS and HIPS, and two-step blended compound of the masterbatch material, GPPS and HIPS

| Material | Cost, in USD, per ton |
|---|---|
| ABS | 850 to 1200 |
| SBS | 1500 to 1700 |
| HIPS | 740 to 1040 |
| GPPS | 700 to 1000 |
| Conventional SBS reinforced GPPS compound (12 wt % of SBS and 88 wt % of GPPS) | 946 to 1284 |
| Highly dispersed masterbatch material (66 wt % of SBS and 34 wt % HIPS) | 1392 to 1676 (total cost including compounding cost) |
| Compounding cost for blending and making masterbatch material | 150 to 200 |
| Example 5: 10 wt % masterbatch material of SBS and HIPS, 17 wt % HIPS and 73 wt % GPPS | 776 to 1074 (total cost including compounding cost) |
| Example 3: 13 wt % masterbatch material of SBS and HIPS, 17 wt % HIPS and 70 wt % GPPS | 797 to 1095 (total cost including compounding cost) |

As noted above, the surface hardness directly affects scratch resistance of products made therefrom. ABS has a relatively high surface hardness of Shore D79 and products made therefrom do not develop scratches easily. For instance, scratches usually do not develop on ABS products when scratched by fingernail. While the surface hardness of the novel polymer blend is Shore D77, which is not as high as that of ABS, products made from the novel polymer blend has a substantially higher scratch resistance than conventional SBS reinforced GPPS polymer blend compound. Conventional SBS reinforced GPPS compound having substantially 13 wt % of SBS and 87 wt % GPPS has a surface hardness of Shore D74.5. On the other hand, the novel polymer blend (e.g. 10 wt % to 13 wt % masterbatch material in which the ratio of SBS to HIPS is 33 to 17) made according to the present invention has an overall SBS content of about 6.6 wt % to 8.58 wt % which is substantially lower than the SBS content in the conventional SBS reinforced polymer blend. With the use of less SBS which is an elastomer, the novel polymer blend made according to the present invention has a higher surface hardness and less prone to scratches, e.g. by fingernail. Experiments have also shown that polymer blends having the constituents of any combination of SBS, HIPS and GPPS but made under the conventional one-step blending method similarly have weaker surface hardness.

Figure 4B:
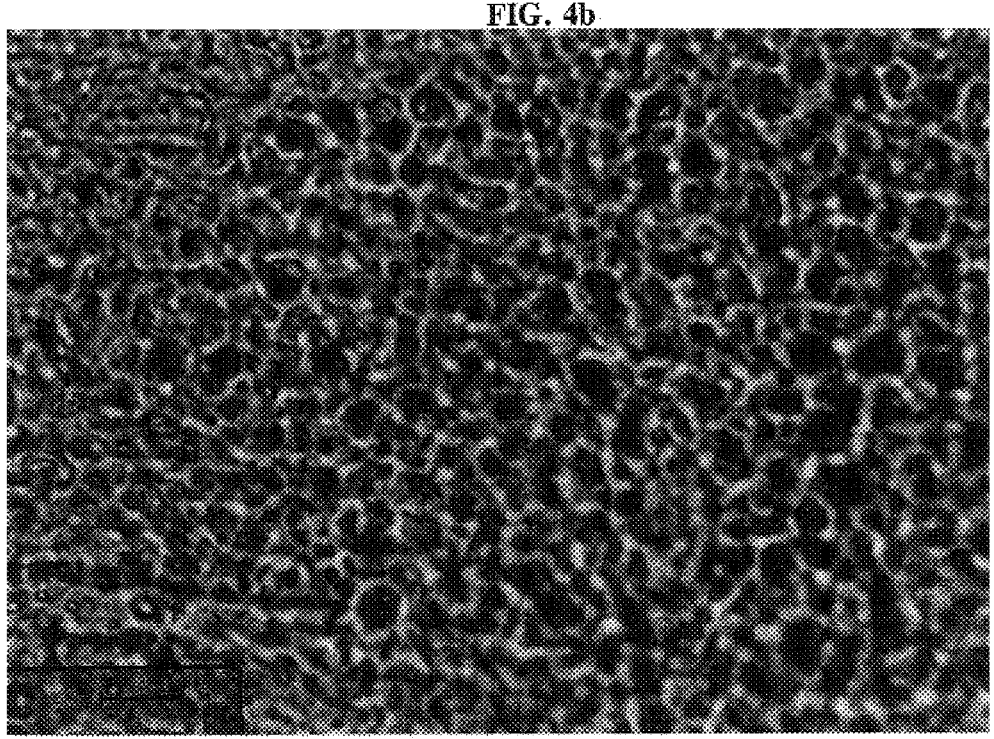
FIG. 4b is a magnified photographic representation showing polymer morphology of a product made from a polymer blend according to the present invention.
Figure 5:
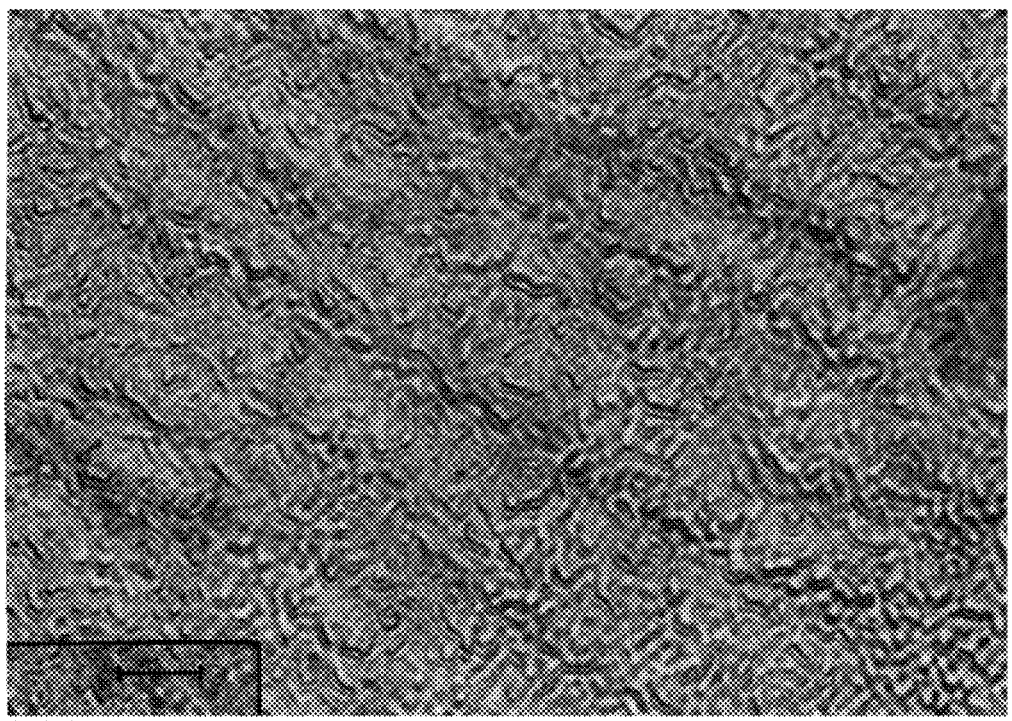
FIG. 5 is a magnified photographic representation showing a polymer morphology of a product made from a conventional styrene-butadiene-styrene thermoplastic elastomer (SBS) reinforced general-purpose polystyrene (GPPS) blended compound.

Turning to the representations of FIGS. 4a, 4b and 5, FIG. 4b is a magnified photographic representation of a polymer morphology of a product made of a novel polymer blend (substantially 13 wt % masterbatch material, 17 wt % HIPS [Styron 470, Dow Chemical], 70-wt % GPPS [DOW666H], wherein the masterbatch material comprises 66 wt % of SBS [Tufprene A, Asahi Chemical] and 34 wt % HIPS [Styron 470, Dow Chemical]) according to the present invention.

FIG. 4a is a magnified photographic representation showing polymer morphology of the masterbatch material used as an intermediary ingredient in making a synthetic polymer blend according to the present invention. These representations were taken using a Zeiss optical microscope at The Hong Kong University of Science and Technology and the product shown therein was molded by Negri Bossi NB2 150 ton injection molding machine with Sulzer static mixing nozzle having four mixing elements. The product was cut by Leica cutter under the temperature condition of minus 60° C. and has a thickness of 1 micron. As can be seen in FIG. 4a, the polymer morphologies have well-dispersed patterns (in its matrix) which indicate that SBS and HIPS, when blended together under the specific conditions described above, are highly compatible with each other. As can be seen in FIG. 4b, the polymer morphologies have corresponding well-dispersed patterns (in its matrix) which indicate that SBS, HIPS and GPPS of the resultant polymer blend are highly compatible with each other. To the contrary, FIG. 5 is a magnified photographic representation of a polymer morphology of a product made from conventional SBS reinforced GPPS blended compound using a 46-mm twin screw at 400 rpm also at the Hong Kong University of Science and Technology. The polymer morphology reveals that SBS and GPPS, when blended together under conventional blending conditions, are not compatible with each other, and SBS is not sufficiently dispersed. This is shown by the unevenly dispersed patterns. Micro-delamination structures are also shown in FIG. 5. SBS is not as highly dispersed in the matrix of conventional SBS reinforced GPPS compound. Referring to FIG. 4a and FIG. 4b. particles in FIG. 4a appear denser although the particles are actually well dispersed (as understood by persons skilled in the art) as shown from the polymer morphology. In the masterbatch material (FIG. 4a), the absence of GPPS together with the use of a higher shear force (see above for specific blending conditions) in the production of the masterbatch material causes the more dispersed polymer morphology. As can be seen, in FIG. 4a a high proportion of the dispersed SBS particles in the masterbatch material have a particle size lowered to about 0.6 to 2 microns. This is resulted from its chemical composition and the specific blending conditions. It is to be noted that there are actually some SBS particles in the masterbatch material having particle size less than about 0.4 micron but these are not shown due to the low resolution of the figures. The microscopic photographs of the figures were taken using visible light and for this reason there is a certain limit on the resolution. Particles with a size of less than about 0.4 micron would have been visible if a more powerful camera were used. On the other hand, during the production of the polymer blend in which GPPS and additional HIPS are added, regular injection molding is used in which lower shear force compared to that used in the first step of blending is involved. As a result, particles in FIG. 4a appear larger. It is however to be noted that while the particles shown in FIG. 4b appear larger than those shown in FIG. 4a, there are actually smaller particles in the polymer, which are SBS particles already embedded in the matrix of HIPS and GPPS. These SBS particles have already been dispersed in the masterbatch material as shown in FIG. 4a. It is also to be noted that studies have shown that once SBS as an elastomer has been sufficiently dispersed in the matrix, its reinforcing function in the final polymer blend (and the masterbatch material) can be enhanced by about 100% when compared to the polymer blend described in U.S. Pat. No. 4,593,063 (and in particular column 3, lines 34–36). In other words, less SBS is needed in the polymer blend made according to the present invention to effect the same reinforcing result. This illustrates that although the prior art may have taught polymer blends having similar chemical constituents, these polymer blends do not have a high level of particle dispersion and this contributes to their inferior mechanical and material properties. In fact, there has been no or insufficient teaching in the prior art correlating level of particle dispersion in polymer blend and mechanical and material properties of the polymer blend and two-step blending process at the same time. The present invention has addressed these issues and provided the teaching of polymer blends having relatively highly dispersed SBS particles, and enhanced mechanical and material properties discussed above. The polymer morphologies shown in the FIGS. 4a, 4b and 5 are easily understood by those skilled in the art.

The following example seeks to illustrate an effect of dispersion in a polymer blend for a unit weight of SBS reinforcement elastomer. In a conventional polymer blend, if a certain unit weight of SBS is dispersed to having a mean diameter of 8μ, the volume of each particle is $$\left(\frac{4}{3}\pi\left(\frac{8}{2}\right)^3\right).$$

(The formula for calculating the volume of a sphere is:

$$V = \frac{4}{3}\pi r^3.)$$

If the SBS is highly dispersed to having a mean diameter of 1μ, the volume of each particle is $$\left(\frac{4}{3}\pi\left(\frac{1}{2}\right)^3\right).$$

It follows that the total number of particles after the relatively high dispersion will be increased by $$512 \text{ times}\left(=\frac{4/3\pi(8/2)^3}{4/3\pi(1/2)^3}\right).$$

The total surface area of the particles will increase by $$8 \text{ times}\left(=\frac{(512)(4\pi)(1/2)^2}{4\pi(8/2)^2}\right).$$

(The formula for calculating the surface area of a sphere is: $A=4\pi r^2$.)

The increase in number and surface area of the particles in the polymer blend contributes to the enhancement of its mechanical and material properties.

As discussed above, another advantage of the novel polymer blend made according to the present invention is its relatively low cost in relation to ABS and conventional SBS reinforced GPPS polymer blend compound. Referring to Table 8, the average costs of producing each ton of novel polymer blend in Example 5 (substantially 10 wt % masterbatch material of SBS and HIPS, 17 wt % HIPS and 73 wt % GPPS) and in Example 3 (substantially 13 wt % masterbatch material of SBS and HIPS, 17 wt % HIPS and 70 wt % GPPS) are USD776 to 1074 and USD797 to 1095 respectively. In other words, the cost reductions in producing the novel polymer blends over ABS are about 8.7% to 10.5% and 6.2% to 8.75% respectively. This is an attractive cost reduction in the plastics industry and a novel polymer blend made according to this invention is very likely to be widely accepted in the plastics industry.

Figure 6:
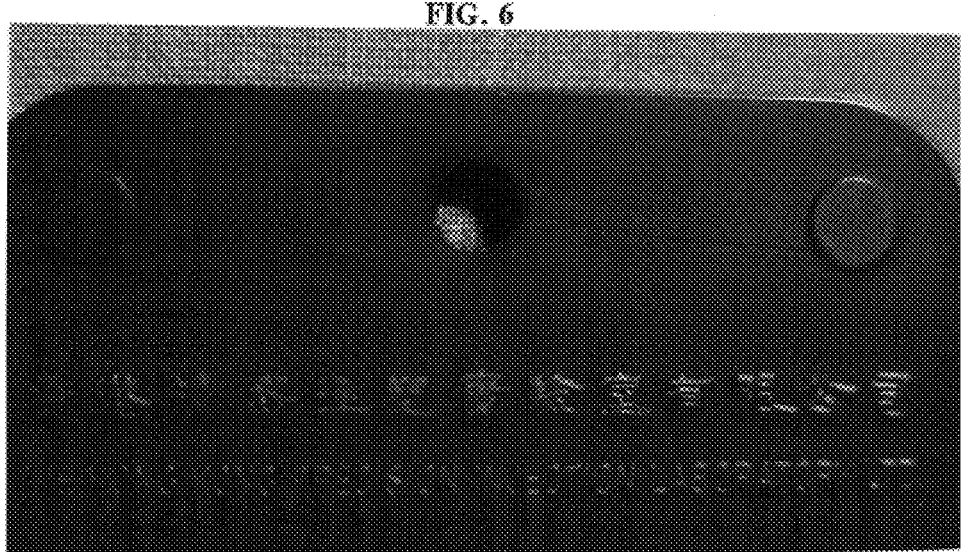
FIG. 6 is a photographic representation showing a product made from a polymer blend made according to the present invention.

Turning to FIGS. 3 and 6, two products made from a novel polymer blend of the present invention and conventional SBS reinforced GPPS respectively are shown. The novel polymer blend comprises substantially 8.6 wt % SBS, 21.4 wt % HIPS and 70 wt % GPPS together with a trace amount (~0.05 wt %) of blue dye (C.I. Solvent blue 36). As can be seen, the product in FIG. 6 has no pearlescent base colour when compared to the product shown in FIG. 3, in which a pearlescent base colour is revealed. The absence of pearlescent colour is due to the higher compatibility and dispersion of SBS in the novel polymer blend, which also allows better colour matching. Studies have shown that polymer blends having the constituents of any combination of SBS, HIPS and GPPS but made under the conventional one-step blending method similarly have at least some undesirable level of pearlescent colour.

Figure 7:
FIG. 7 is a photographic representation showing two products made from a polymer blend made according to the present invention.
Figure 8:
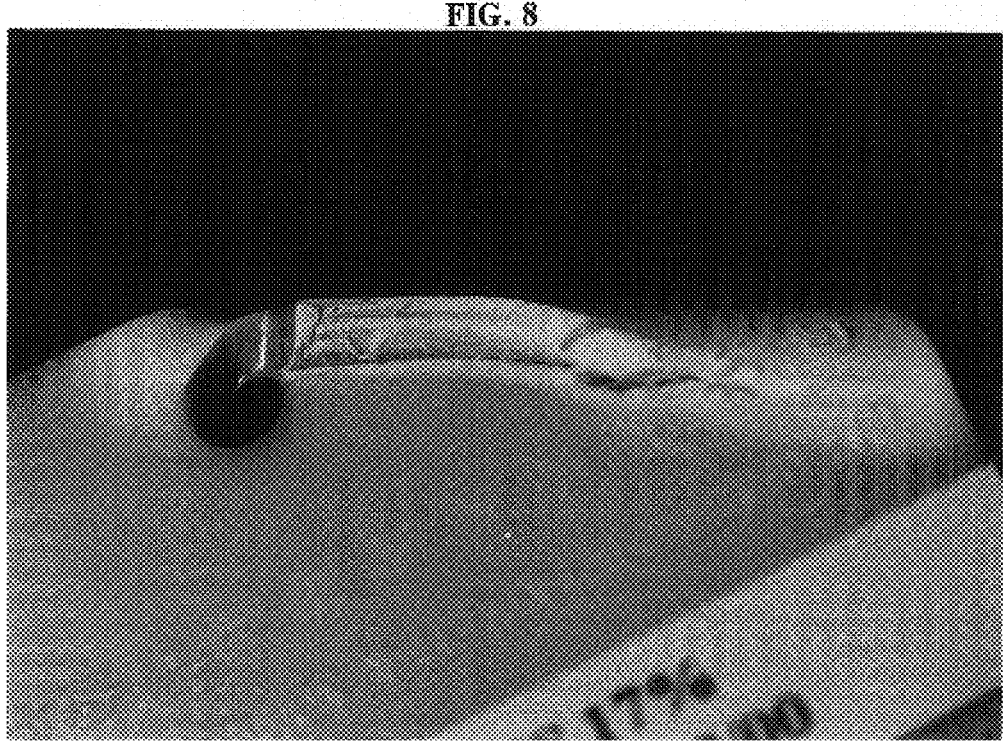
FIG. 8 is a photographic representation showing a crack of one the products shown in FIG. 7.

Turning to FIGS. 2, 7 and 8, FIG. 7 is a photographic representation showing two products made from a polymer blend made according to the present invention. FIG. 8 is a photographic representation showing a crack of the product shown in FIG. 7. The products are molded by the novel two-step blending method as described above and comprise substantially 13 wt % masterbatch material, 17 wt % HIPS and 70 wt % GPPS. Negri Bossi NB 2, a 150-ton clamping force injection-molding machine at the Hong Kong Precision Injection Laboratory Limited, was used to carry out the molding. As compared to the crack of the article made of a conventional SBS reinforced GPPS blended compound shown in FIG. 2, a more layered pattern is revealed, whereas in FIG. 8, there is a substantial improvement of the delamination problem. Referring to the edges of the cracks shown in both FIGS. 8 and 2, it can be seen that the edges along the crack of the article in FIG. 2 are distinctively sharper than those of the crack of the article shown in FIG. 8. This is due to the lessened weld-line problem in the product (shown in FIG. 8) made of the novel polymer blend according to the present invention. Studies have shown that products made from polymer blends having the constituents of any combination of SBS, HIPS and GPPS but made under the conventional one-step blending method similarly show relatively sharper edges when cracked.

As can been seen, the novel polymer blend made according to the two-step blending method of the present invention as illustrated above has a number of advantages over ABS and conventional SBS reinforced GPPS blended compound, e.g. cost, and colour-matching properties. While there may have some suggestion of a polymer blend having only similar chemical composition in the prior art, its mechanical properties and chemical morphologies would be different and inferior than that of the polymer blends according to the present invention. As noted, the polymer blends of the present invention are made by the above described two-step method under the specific conditions.

The contents of each of the references discussed above, including the references cited therein, and Thermoplastic Elastomers, 2nd Edition, D. R. Paul, Hanser Publishers. It is to be noted that numerous variations, modifications, and further embodiments are possible and accordingly, all such variations, modifications and embodiments are to be regarded as being within the scope of the present invention.

What is claimed is:

1. An intermediary ingredient for use in making a synthetic polymer blend comprising:
   a) a non-hydrogenated styrene-butadiene-styrene thermoplastic elastomer (SBS), and
   b) a compatibilizer selected from the group consisting of polybutadiene grafted polystyrene (HIPS), styrene-hydrogenated-butadiene-styrene (SEBS) and a combination thereof,
   wherein $$\frac{\text{weight of said SBS}}{\text{weight of said compatibilizer}}$$

is $$\frac{1}{4}$$

to 4, and
   wherein a mean particle size of said SBS in said intermediary ingredient is 3 microns or less in diameter, and
   wherein the intermediary ingredient comprises 60 wt % to 80 wt % of said SBS.

2. An intermediary ingredient as claimed in claim 1 wherein said SBS comprises 20 wt % to 70 wt % of butadiene.

3. An intermediary ingredient as claimed in claim 2 wherein said SBS comprises 40 wt % to 70 wt % of said butadiene.

4. An intermediary ingredient as claimed in claim 3 wherein said SBS comprises 60 wt % of said butadiene.

5. An intermediary ingredient as claimed in claim 1 wherein $$\frac{\text{weight of said SBS}}{\text{weight of said compatibilizer}}$$

in said intermediary ingredient is $$\frac{33}{17}.$$

6. The intermediary ingredient as claimed in claim 1, further comprising general purpose polystyrene (GPPS).

7. A method of producing an intermediary ingredient for use in making a synthetic blend comprising blending a non-hydrogenated styrene-butadiene-styrene thermoplastic elastomer (SBS) with a compatibilizer selected from the group consisting of polybutadiene grafted polystyrene resin (HIPS), styrene-hydrogenated-butadiene-styrene (SEBS) and a combination thereof, and dispersing particles of said SBS to a mean particle size of 3 microns or less in diameter, to form an intermediary material,
wherein $$\frac{\text{weight of said SBS}}{\text{weight of said compatibilizer}}$$

is $$\frac{1}{4}$$

to 4, and
wherein the intermediary ingredient comprises 60 to 80 wt % of said SBS.

8. A method as claimed in claim 7 wherein said SBS comprises 20 wt % to 70 wt % of butadiene.

9. A method as claimed in claim 8 wherein said SBS comprises 40 wt % to 70 wt % of said butadiene.

10. A method as claimed in claim 9 wherein said SBS comprises 60 wt % of said butadiene.

11. The method of producing an intermediary ingredient as claimed in claim 7, wherein the intermediary ingredient further comprises general purpose polystyrene (GPPS).

12. A method of producing an intermediary ingredient for use in making a synthetic blend comprising blending a non-hydrogenated styrene-butadiene-styrene thermoplastic elastomer (SBS) with a compatibilizer selected from the group consisting of polybutadiene grafted polystyrene resin (HIPS), styrene-hydrogenated-butadiene-styrene (SEBS) and a combination thereof, and dispersing particles of said SBS to a mean particle size of 3 microns or less in diameter, to form an intermediary material,
wherein $$\frac{\text{weight of said SBS}}{\text{weight of said compatibilizer}}$$

in said intermediary ingredient is $$\frac{33}{17}.$$

13. A method of producing a synthetic polymer blend comprising steps of:
a) blending a styrene-butadiene-styrene thermoplastic elastomer (SBS) with a compatibilizer selected from the group consisting of polybutadiene grafted polystyrene resin (HIPS), styrene-hydrogenated-butadiene-styrene (SEBS) and a combination thereof, and dispersing particles of said SBS to a mean particle size of about 3 microns or less in diameter, to form an intermediary ingredient, wherein $$\frac{\text{weight of said SBS}}{\text{weight of said compatibilizer}}$$

is $$\frac{1}{4}$$

wherein the intermediary ingredient comprises 60 wt % to 80 wt % of said SBS; and
b) blending said intermediary ingredient in said step a) with further ingredient(s) including at least general purpose polystyrene (GPPS), and further dispersing said SBS particles, to form said synthetic polymer blend, wherein $$\frac{\text{weight of said intermediary ingredient}}{\text{weight of said GPPS}}$$

is $$\frac{1}{19} \text{ to } \frac{5}{6}.$$

14. A method as claimed in claim 13 wherein in said step b), said further ingredients comprise further HIPS, and wherein said synthetic polymer blend comprises 5 wt % to 50 wt % of said further HIPS.

15. A method as claimed in claim 13 comprising a step c) of adding a first additive for improving surface gloss of said synthetic polymer blend or products made thereof.

16. A method as claimed in claim 15 wherein said first additive is present in an amount of 0.5 wt % of said polymer blend.

17. A method as claimed in claim 15 wherein said first additive is selected from the group consisting of zinc stearate, waxes and silicones.

18. A method as claimed in claim 13 comprising a step d) of adding at least a second additive selected from the group consisting of coupling agents, cross-linking agents, peroxides and other compatibilizers.

19. A method as claimed in claim 13 wherein said synthetic polymer blend comprises 10 wt % to 13 wt % of said intermediary ingredient.

20. A method as claimed in claim 13 wherein said synthetic polymer blend comprises 30 wt % to 90 wt % of said GPPS.

21. A method as claimed in claim 13 wherein said synthetic polymer blend comprises 75 wt % to 95 wt % of said GPPS.

22. A method as claimed in claim 13 comprising a step e) in or after said step b) of subjecting said synthetic polymer blend to at least one plastic processing method selected from the group consisting of injection molding and extrusion.

23. A synthetic polymer blend made by a method defined in claim 13, wherein said SBS is non-hydrogenated.

24. A method of producing a synthetic polymer blend comprising steps of:
a) dispersing a styrene-butadiene-styrene thermoplastic elastomer (SBS) with a compatibilizer selected from the group consisting of polybutadiene grafted polystyrene resin (HIPS), styrene-hydrogenated-butadiene-styrene (SEBS), poly-dimethyl-phenylene-oxide (PPO) and combinations thereof, to form an intermediary ingredient by blending using an extruder having screw shearing elements, and subjecting said SBS and said compatibilizer with a shear rate of 131,440 or more, wherein $$\frac{\text{weight of said SBS}}{\text{weight of said compatibilizer}}$$

is $$\frac{1}{4}$$

to 4, and wherein $$\frac{\text{net power consumption for polymer dispersion of a main motor of said extruder}}{\text{output of said intermediate ingredient by said extruder}}$$

is 0.14 kW/kg or more; and b) blending said intermediary ingredient in said step a) with further ingredient(s) including at least general purpose polystyrene (GPPS), to form said synthetic polymer blend, wherein $$\frac{\text{weight of said intermediary ingredient}}{\text{weight of said } GPPS}$$

is $$\frac{1}{19} \text{ to } \frac{5}{6}.$$

25. A method as claimed in claim 24 wherein said compatibilizer is said HIPS.

26. A method as claimed in claim 24 wherein in step b), said further ingredients comprise further HIPS, and wherein said synthetic polymer blend comprises 5 wt % to 50 wt % of said further HIPS.

27. A method as claimed in claim 24 comprising a step c) of adding a first additive for improving the surface gloss of said synthetic polymer blend or products made thereof.

28. A method as claimed in claim 27 wherein said first additive is of 0.5 wt % of said synthetic polymer blend.

29. A method as claimed in claim 27 wherein said first additive is selected from the group consisting of zinc stearate, waxes and silicones.

30. A method as claimed in claim 24 comprising a step d) of adding at least a second additive selected from the group consisting of coupling agents, cross-linking agents, peroxides and other compatibilizers.

31. A method as claimed in claim 24 wherein said synthetic polymer blend comprises 10 wt % to 13 wt % of said intermediary ingredient.

32. A method as claimed in claim 24 wherein in step b) said synthetic polymer blend comprises 30 wt % to 90 wt % of said GPPS.

33. A method as claimed in claim 24 wherein in step b) said synthetic polymer blend comprises 75 wt % to 95 wt % of said GPPS.

34. A method as claimed in claim 24 comprising a step e) in or after said step b) of subjecting said synthetic polymer blend to at least one plastic processing method selected from the group consisting of injection molding and extrusion.

35. A synthetic polymer blend made by a method as defined in claim 24, wherein said SBS is non-hydrogenated.

* * * * *